D. NORMAN.
Improvement in Cultivators.
No. 129,420.  Patented July 16, 1872.
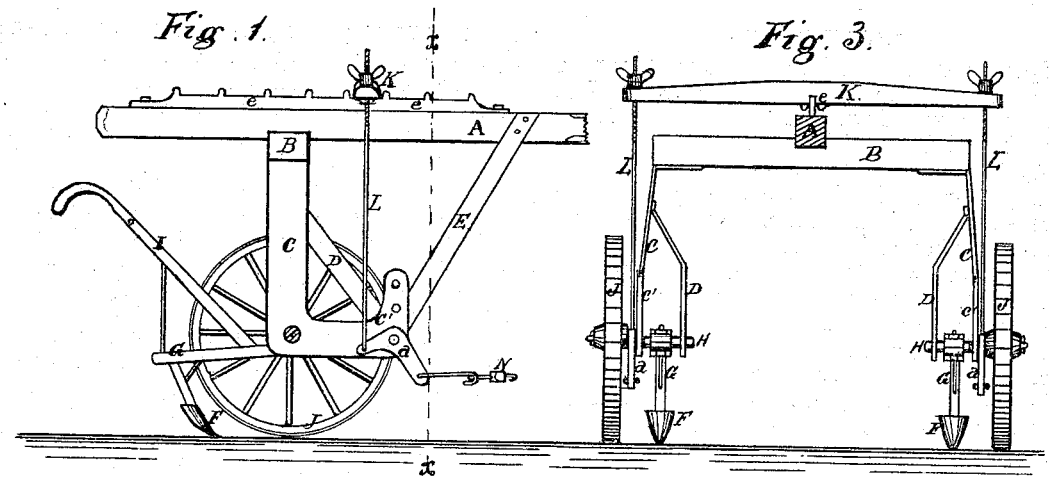
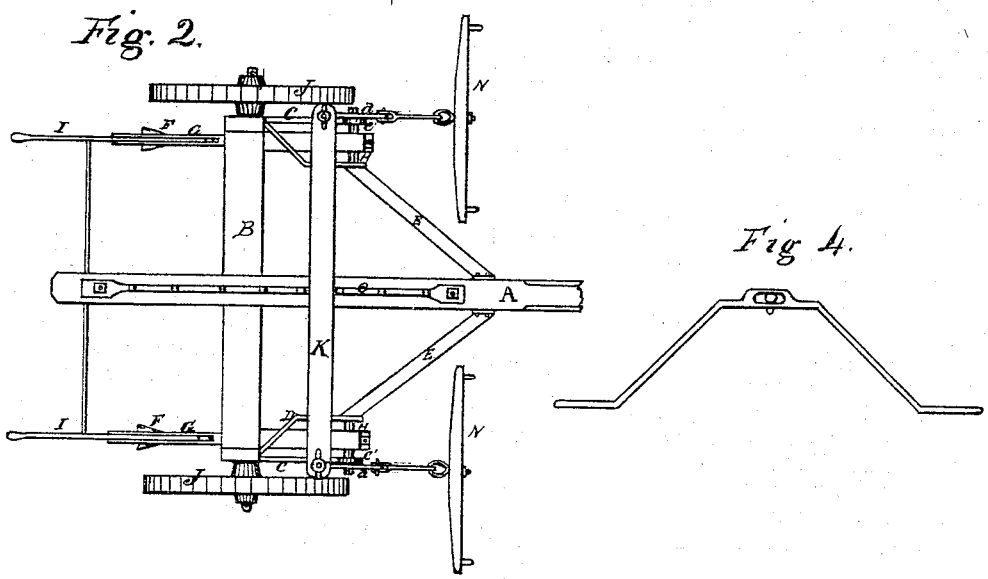
Witnesses  
O. F. Mayhew.  
J. M. Commons.
David Norman, Inventor.

UNITED STATES PATENT OFFICE.

DAVID NORMAN, OF CRAWFORDSVILLE, INDIANA.

IMPROVEMENT IN CULTIVATORS.

Specification forming part of Letters Patent No. 129,420, dated July 16, 1872.

SPECIFICATION.

Specification describing certain Improvements in Corn-Plows, invented by DAVID NORMAN, of Crawfordsville, in the county of Montgomery and 'State of Indiana.

My invention relates to the construction and arrangement of the draft device by which the horses are attached to the plow in that class of corn-plows in which the axle or central portion between the wheels is elevated so as to pass over the tops of the corn; and it consists in the arrangement of angular levers pivoted to the lower part of the frame-work of the plow, combined with the arrangement of an adjustable balancing or equalizing beam that rests on the top of the tongue or guide-pole, the horses being hitched to one end of the angular levers, while the other end is connected by rods to the ends of the balancing or equalizing beam, which is arranged to be adjustable backward or forward, so that the draft of the horses may be made to balance or support any desired portion of the weight of the tongue and thereby relieve their necks of the weight or strain. The same device will also serve to equalize the unequal draft of the horses, which enables me to guide the plow with greater ease and precision. This arrangement of the hitching device also enables me to bring the hoes in closer relation to it, by which they are rendered more easy to control and less liable to injure the corn.

Figure 1 is a side elevation of a corn-plow embodying my invention, showing one wheel left off. Fig. 2 is a top or plan view of the same. Fig. 3 is a vertical transverse section taken on line $xx$, Fig. 1. Fig. 4 is a front view of the neck-yoke which it is contemplated to use with this implement.

The frame-work of the implement consists of the tongue or guide-pole A, transverse beam B, downward-projecting arms C, and braces D E. The hoes F are fixed to beams G and hung on rods H, and provided with handles I in the usual manner. The implement is supported and runs on wheels J.

My improvements consist in the angular levers $a$ pivoted in the downward-projecting arms C, which have also an upward projection, C', provided with holes wherein to adjust the levers at a greater or less height, so that, in connection with the equalizing-beam K, the draft may be varied as may be required and the adjustable balancing or equalizing bar K connected with the angular levers $a$ by the rods L, as shown. The horses are hitched to the levers $a$ by single-trees N in the usual manner. The balancing or equalizing bar K may be adjusted in any of the notches in the notched bar $e$ on top of the guide-pole A, and thus the forward end of the tongue supported so as to bring greater or less weight on the necks of the horses, as may be desired. The rods L are furnished with screws and thumb-nuts at the top, by which they may be readily adjusted.

Claim.

I claim as my invention—

The angular levers $a$, in combination with the adjustable balancing or equalizing bar K, connecting-rods L, and the downward-projecting arms C provided with the forward and upward projections C', all constructed and arranged substantially as and for the purposes set forth.

DAVID NORMAN.

Witnesses:
O. F. MAYHEW,
J. M. COMMONS.